March 16, 1971  A. E. L. OHLSSON  3,570,157
DISPLAY DEVICE FOR DISPLAYING ILLUMINATED SYMBOLS
Filed Oct. 7, 1968
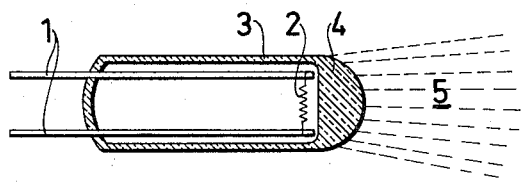
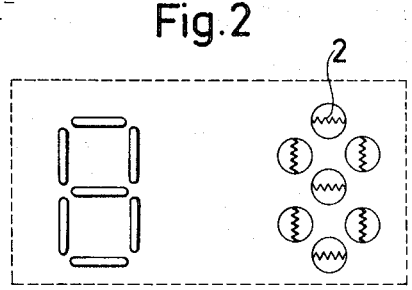
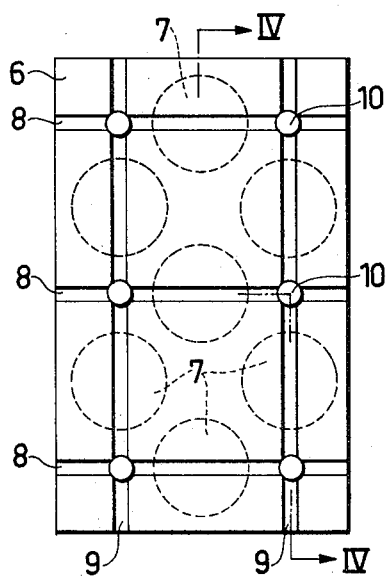
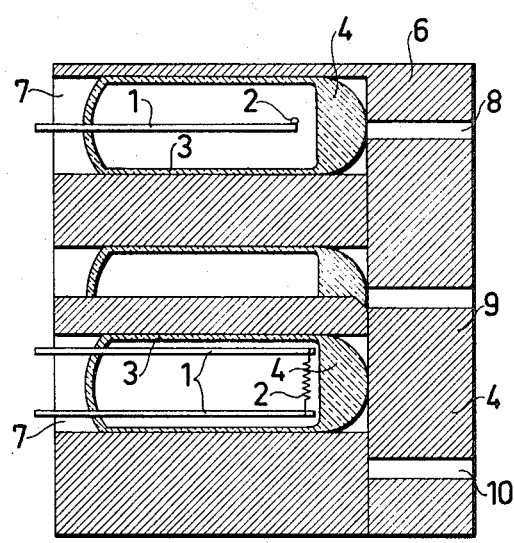
INVENTOR
AXEL ERIK LUDVIG OHLSSON
BY Hane and Baxley
ATTORNEYS

United States Patent Office 3,570,157
Patented Mar. 16, 1971

3,570,157
DISPLAY DEVICE FOR DISPLAYING ILLUMINATED SYMBOLS
Axel Erik Ludvig Ohlsson, Karlskoga, Sweden, assignor to Aktiebolaget Bofors, Bofors, Sweden
Filed Oct. 7, 1968, Ser. No. 765,544
Claims priority, application Sweden, Oct. 11, 1967, 13,867/67
Int. Cl. G09f *13/06*
U.S. Cl. 40—130                              6 Claims

ABSTRACT OF THE DISCLOSURE

A display device for displaying illuminated symbols has in a solid opaque block a plurality of bores extending from one side and terminating short of the opposite side. A plurality of grooves formed in this opposite side intersect the bores opening into the same and across each other at points other than points in registry with the bores. An opaque pin is fitted in each crossing point. Light bulbs fitted in the bores illuminate the grooved sections intersecting the bores and limited by the pins. The thus illuminated groove sections represent the symbols to be displayed.

---

The present invention is concerned with a display device of the type in which characters in the form of digits and/or symbols appear light in colour against a dark background and are composed of a plurality of essentially identical, elongated sections of light to form individual characters within one and the same position.

The Swedish patent application No. 4,256/1967 describes a display device of this nature, adapted for instance to be used in a range finder, said device being developed to satisfy a number of requirements, namely that (a) the digits should have small dimensions, with a height of approximately 5 mm., (b) that the digits should stand out brightly against the dark background so that they can be projected into an optic sighting instrument and there read against the image of, for instance, a sun-illuminated snowy landscape, (c) that a plurality of digit rows can be displayed within a limited area, and thus a display device for one digit position must be so small that its external measurements only slightly exceed the dimensions of the digit, (d) that the characters obtain such form that they are easily readable, and (e) that the device is inexpensive.

These requirements have been satisfied by producing the first mentioned character forming sections of light with the aid of a source of light positioned in an opaque tube, the viewing end of which is formed with a slot for allowing light to pass through from the light source, the slot opening determining the dimensions of the sections of light.

The display device obtained in this way has been found to fulfill practically all the requirements placed thereon. It has been discovered, however, that in certain special cases greater brightness strength is required than that which can be obtained with the known device, in the absence of any possibility, however, of increasing the size of the device to any great extent.

This problem has been solved by using brighter bulbs or lamps provided with a glass tube which is designed as a collecting lens. The high-power bright bulb causes additional requirements to be placed on the display device, namely a more effective dissipation of heat.

The present invention is therefore concerned with a display device of the type in which characters in the form of digits and/or symbols appear light in colour against a dark background, and are composed of a plurality of essentially identical elongated sections of light, so that different characters are formed in one and the same position, and wherein each of said sections of light is produced by a light source, in the form of an electric bulb, situated in an opaque tube, where the viewing end of the tube is designed to contain a slot which admits light to pass through from the source of light, and where the opening of the slot determines the dimensions of the section of light.

The invention is mainly characterized in that the opaque tubes required for the characters or symbols comprise channels disposed in one and the same block, which is made of a material presenting good heat conducting properties, and wherein the block is provided at the viewing side opposite respective channels, with openings, which form the slots arranged to allow light emanating from the light sources to pass through.

Further embodiments and characterizing features of the invention will be apparent from the following description, which is made with reference to the accompanying drawing and in which FIG. 1 shows an electric bulb of a type which has been found particularly suited for use with the display means according to the invention, FIG. 2 ilustrates in the left-hand portion thereof the positioning of the slots when it is desired to reproduce all the decimal digits from 0 to 9 by selective illumination of the electric bulbs, and in the right-hand portion how the wires in the electric bulbs should be placed in the case of such a slot arrangement, FIG. 3 is a front view of a block, in which the channels which form opaque tubes are formed, FIG. 4 is a section view taken through the lines IV—IV in FIG. 3, showing electric bulbs inserted in their respective opaque tubes or channels.

The drawing shows an illustrative embodiment of the invention, by which it is possible to display all decimal digits from 0 to 9, using sections of light. In the shown embodiment seven sections of light are used in a manner known per se (FIG. 2), the slots being arranged to form a stylized figure eight. This is a configuration which has been found to impart good readability to the digits formed by the strips of light obtained by selective illumination of the electric bulbs. It should be mentioned that other character configurations can be used, for instance, in the form of letters, and that the invention is not restricted to such a configuration of slots and opaque tubes as shown in FIG. 2.

As previously mentioned, each strip of light is obtained by an illumination caused by means of an electric bulb. In prior known devices of this type specially designed electric bulbs are used, which present a diameter of 1.5 mm. As previously mentioned, an additional requirement is placed on these devices, mainly that a higher degree of brightness is obtained, and consequently stronger bulbs have been taken into use.

Such a bulb is shown in FIG. 1, where the wire conductors of the bulb are designated 1, the filament 2, the glass envelope 3 and in which the front end of the glass envelope facing a slot is identified by the numeral 4. The front end 4 of the glass envelope 3 is designed as a collecting or condenser lens, whereby upon energizing the filament 2 a well collected bunch of light rays 5 leaves the bulb in the axial direction thereof. It has not been possible hitherto to manufacture the bulb, which is more powerful than the bulbs previously used for this purpose, and the front end 4 of the glass envelope of which is designed as a collecting lens, with a minimum diameter of less than 2.5 mm., which means an increase in the diameter of approximately 65% over the bulbs previously used. In order that each device intended for a digit or a character does not obtain a corresponding increase in size, which would be the case if the previously described method of construction were applied, a new method of construction has been devised, which will now be described with reference to FIGS. 3 and 4.

The new method of construction is based upon the assumption that the opaque tubes, in accordance with the spirit of the present invention, are comprised of the walls of the bores, holes or channels disposed in one and the same block, made of material which presents good heat conducting properties. Such a material which presents many advantages both from the manufacturing aspect and from the functioning aspect, is aluminium.

FIG. 3 illustrates a block 6 of aluminium for instance, intended for a system of slots and bulbs such as shown in FIG. 2, as seen from the viewing end of the block. The block 6, which has a height of less than 10 mm. and a width of less than 7 mm., is provided with seven bores or passages 7, which have an inner diameter sufficient to allow the electric bulbs shown in FIG. 1 to be inserted in their respective passages 7 with a good fit. The passages 7 extend from the side of the block remote from the viewing side, that is the side from which the wire conductors 1 extend from the bulb and are connected to a suitable switch means to allow selective energization of the filaments 2 as required for displaying the decimal digits desired in that particular instance.

The passages 7 do not extend right up to the viewing side. The viewing side is provided with grooves for forming the slots 8 and 9 which permit exit of the light, so that the strips of light necessary for forming the characters are obtained. These grooves are shown in FIGS. 3 and 4 as extending in respective directions across the whole of the side in question, and in the shown embodiment they can be made by means of a cutting operation. The resulting grooves 8 and 9 must, of course, be deep enough to open into respective passages 7. Hence, intersections are obtained between the grooves, and these intersections permit light to pass from a horizontal groove section or slot to a vertical groove section or slot, and this means that the slots, or more accurately the sections of light intended to be produced by means of the slots, are not well defined, but that so much stray light is obtained that reading is made difficult or gives rise to error. In the shown embodiment an opaque pin 10 made of some suitable material has been inserted in the intersecting points to prevent this from happening.

In view of the fact that it is desired to use the light from respective electric bulbs to the best advantage it is, of course, preferable when using the bulbs shown in FIG. 1 to insert the bulbs into the passages 7 so that the filaments extend substantially in the longitudinal direction of the slots or grooves 8 or 9, as shown in FIG. 2.

As previously mentioned, the block 6 should be made of a good heat-conducting material, and with regard to the ease at which it can be worked, aluminium has been found a particularly suitable material, which combines low density with good heat conducting properties, but naturally the invention is not restricted to the use of aluminium, but other material presenting good heat conducting properties may also be used.

Furthermore, in the illustrative embodiment it has been assumed that the passages which form the opaque tubes and the grooves which form slots are made by means of mechanical chip cutting operations. It will readily be understood that the intended result with regard to heat conduction, accommodation of the electric bulbs and the transmission of the bunches of light rays can also be obtained by other methods of manufacturing the block, e.g. by forming the passages 7 and the grooves or slots 8 and 9 in conjunction with moulding or casting the block 6 in some suitable manner, whereby it is possible, by using inserts of suitable shape and form, to form the passages and the slots at the same time.

The invention is not restricted to the described and illustrated embodiments but can be varied in the scope of the following claims.

I claim:

1. A display device for displaying illuminated symbols, said display device comprising:

an opaque block having two opposite mutually parallel sides, said block including a plurality of bores extending from one of said sides and terminating short of the other side, and a plurality of grooves in the other one of said sides, said grooves being disposed to intersect the bores and to cross each other at points other than points in registry with the bores, depth of the grooves being such that they open into said bores;

a light bulb placed in each of said bores for directing light into the groove sections intersecting the bores; and an opaque pin fitted into the grooves at the crossing points thereof, the groove sections intersecting the bores as limited by said opaque pins defining the outlines of the illuminated symbols to be displayed.

2. The display device according to claim 1 wherein said block has a substantially rectangular configuration, said crossing grooves being disposed parallel to the edges of the block defining said opposite sides thereof.

3. The display device according to claim 1 wherein each of said light bulbs has an elongate filament, said filaments being disposed parallel to the respective groove sections.

4. The display device according to claim 3 wherein each of said light bulbs has an envelope forming a condenser lens at its end facing the grooved side of the block.

5. The display device according to claim 1 wherein said block is a solid block made of a material of high heat conductivity.

6. The display device according to claim 5 wherein said block is made of aluminum.

References Cited

UNITED STATES PATENTS

| | | | |
|---|---|---|---|
| 3,210,876 | 10/1965 | Towne | 40—130E |
| 3,252,158 | 5/1966 | Naylor | 340—378(.1) |
| 3,261,013 | 7/1966 | Naylor | 340—378 |
| 3,408,523 | 10/1968 | Demarest et al. | 340—336X |

OTHER REFERENCES

IBM Technical Disclosure Bulletin, Keller and Spanial, vol. 7, No. 5, October 1964.

JEROME SCHNALL, Primary Examiner

R. CARTER, Assistant Examiner

U.S. Cl. X.R.

340—378